United States Patent [19] | [11] 4,032,883

Gibson | [45] June 28, 1977

[54] PORTABLE TRAFFIC SIGNAL

[76] Inventor: Preston H. Gibson, 129 Anarece Ave., Auburndale, Fla. 33623

[22] Filed: Dec. 5, 1975

[21] Appl. No.: 637,882

Related U.S. Application Data

[63] Continuation-in-part of Ser. No. 483,770, June 27, 1974, and a continuation-in-part of Ser. No. 582,935, June 2, 1975.

[52] U.S. Cl. ................................ 340/41 A; 340/84

[51] Int. Cl.$^2$ ...................... B60Q 1/00; G08G 1/00

[58] Field of Search .............. 340/41 A, 22, 74, 84, 340/321

[56] References Cited

UNITED STATES PATENTS

| | | | |
|---|---|---|---|
| 2,401,940 | 6/1946 | Lange | 340/41 A |
| 2,829,362 | 4/1958 | Terrill | 340/22 |
| 2,838,744 | 6/1958 | DeWald | 340/84 |
| 2,941,185 | 6/1960 | Mullikin | 340/41 A |
| 3,046,521 | 7/1962 | Cantwell et al. | 340/84 |

*Primary Examiner*—Donald J. Yusko

*Attorney, Agent, or Firm*—George B. Oujevolk

[57] ABSTRACT

A portable traffic signal for serving as a temporary traffic signal, the device being readily portable due to its weight and size so that it can be easily and quickly set up; the device includes a hermetically sealed twelve volt battery, six double lens lights, two of which are red, two of which are green and two of which are amber. A solid state battery charger, an internal timer and a choice of ground rod, tripod or suspension rod are provided.

1 Claim, 7 Drawing Figures

PORTABLE TRAFFIC SIGNAL

This application is a continuation-in-part of my presently co-pending application Ser. No. 483,770 filed June 27, 1974 and, Ser. No. 582,935 filed June 2, 1975.

BACKGROUND OF THE INVENTION

This invention relates to portable traffic signals, and more particularly to emergency portable traffic signals which can readily be set up when needed.

OBJECTS OF THE INVENTION

A principal object of the present invention is to provide a portable traffic light for serving state, county and city traffic departments.

Another object of the present invention is to provide a portable traffic light which can be set up immediately upon either a tripod or a ground rod, or which can be suspended overhead.

Still another object of the present invention is to provide a portable traffic light which will operate continuously for approximately twelve hours after which time it can be plugged into a 110 AC circuit outlet for recharging.

Still another object of the present invention is to provide a portable traffic light which additionally can be used when traffic requires control when or wherever no permanent traffic lights are installed, such as at sport events, disasters, school zones, playground crossings, inoperative traffic signals due to power failure, and, intersections where needed but too expensive to install permanent traffic lights.

Still a further object of the present invention is to provide a portable traffic light that is also designed to eliminate the endangering of life for policemen while directing traffic, and which will release policemen and police cars for normal use in other duties.

Other objects of the present invention are to provide a portable traffic light which is simple in design, inexpensive to manufacture, rugged in contruction, easy to use and efficient in operation.

Other objects of the invention will be obvious and will in part appear hereinafter.

SUMMARY OF THE INVENTION

Generally speaking, the present invention contemplates a portable traffic signal device having a cabinet. Attached to the cabinet are a moveable light assembly means which is moveable between a visible and a retracted position with respect to the cabinet. Within the cabinet are electric power means which are electrically connected to the light assembly means and control means mounted within the cabinet are electrically connected to said electric power means and said light assembly means so that the signal lights in the light assembly may be properly regulated.

The invention accordingly comprises the features of construction, combination of elements and arrangement of parts which will be exemplified in the description hereinafter set forth and the scope of the invention will be indicated in the claims.

BRIEF DESCRIPTION OF THE DRAWINGS

For a fuller understanding of the nature of the invention, reference should be had to the following detailed description taken in connection with the accompanying drawings in which.

Similar reference characters refer to similar parts throughout the several views of the drawings.

DETAILED DESCRIPTION

Figure 1:
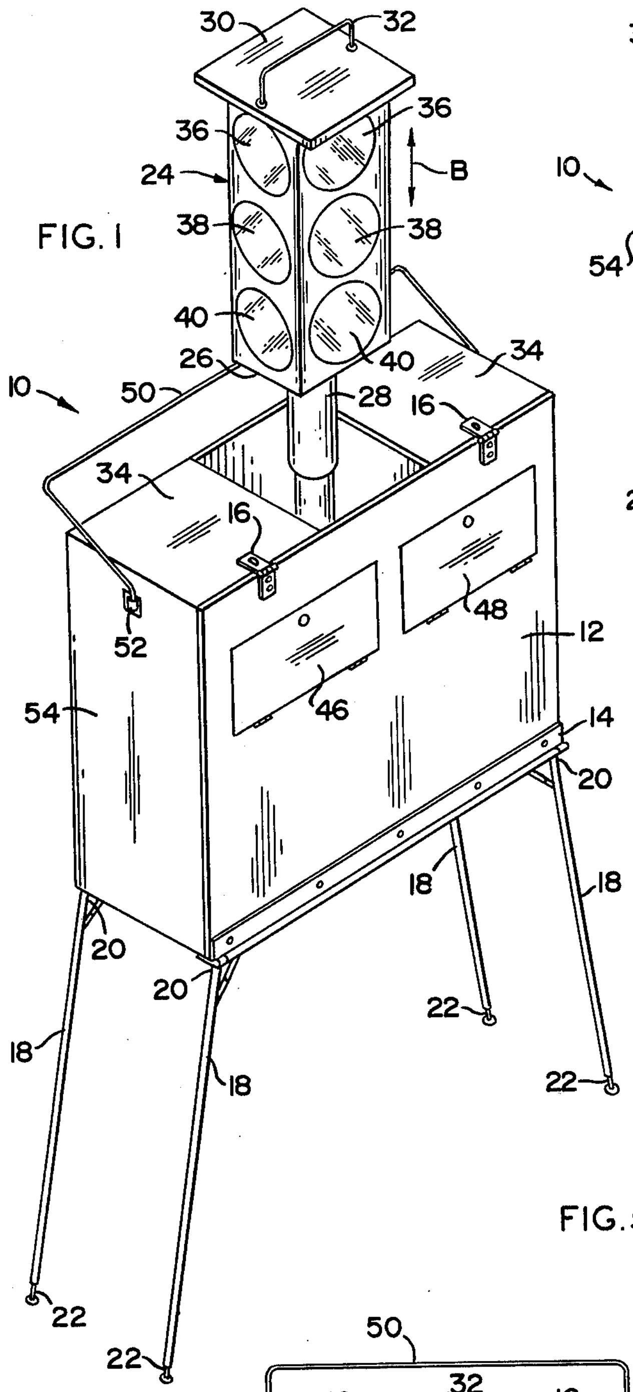
FIG. 1 is a perspective view of one embodiment of the present invention.
Figure 2:
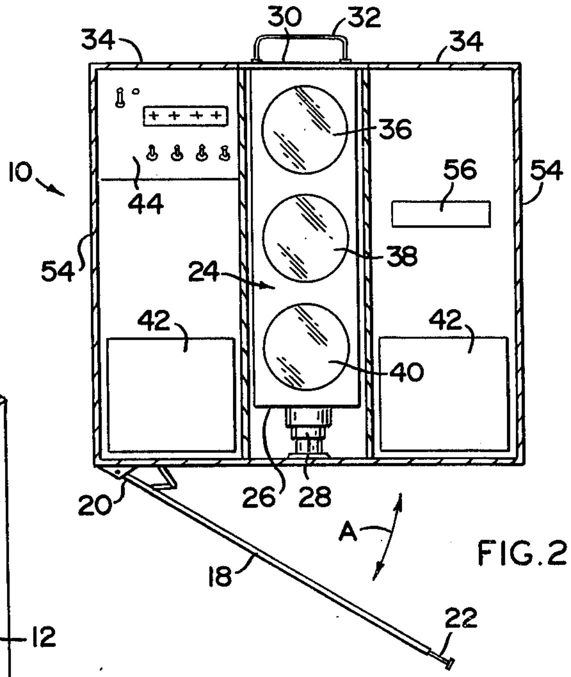
FIG. 2 shows a sectional view showing the light assembly in retracted position.

The present invention relates to a portable traffic signal device generally indicated as 10. As best seen in FIG. 1, device 10 is formed in a box-like configuration and is preferably made from a strong, light material such as aluminum. Front 12 of device 10 is connected to the bottom of the devices by hinge 14. Front 12 is retained in a closed position by virtue of latches 16. Releasing latches 16 allows front 12 to fully open to expose the interior of the device as shown in FIG. 2. Folding legs 18 are hingedly attached to the bottom of the device 10 at their respective ends 20 as best seen in FIG. 2. Also as best seen in FIG. 2, this hinged attachment of legs 18 allows them to be moved into and out of supporting relation to device 10 as indicated by arrow A. Legs 18 further include adjustble feet 22 mounted on the free ends thereof for the purpose of levelling device 10 regardless of the nature of the terrain on which it is placed.

Figure 6:
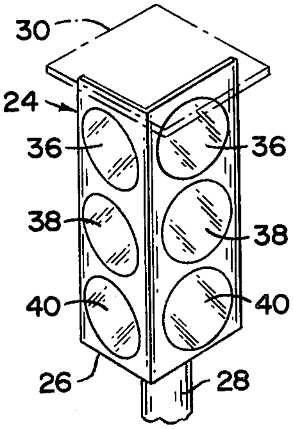
FIG. 6 presents a partial cutaway view showing the light assembly of FIG. 1 in detail; and, FIG. 7 shows an electric schematic circuit diagram for the light assembly contemplated.
Figure 5:
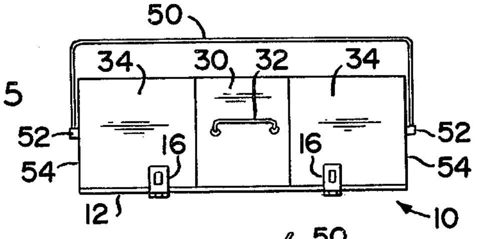
FIG. 5 is a plan view of the device shown in FIG. 3.

As best seen in FIGS. 1 and 2, a light assembly, generally indicated as 24, is movably disposed within device 10. As shown in detail in the view of FIG. 6, assembly 24 is substantially L-shaped so that it may be viewed from four points of approach. Assembly 24 is fixedly attached at its base 26 of telescoping support 28. A cover 30, including an assembly handle 32 is attached to the top of assembly 24 so that assembly 24 may be extended and retracted as indicated by arrow B. As best seen in FIG. 2, when assembly 24 is completely retracted, cover 30 assumes a position substantially co-planar with top portions 34 of devive 10.

Figure 3:
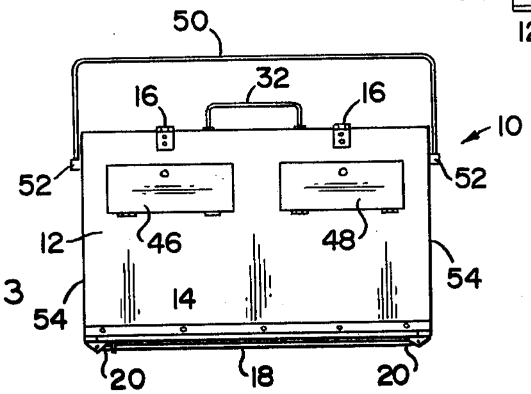
FIG. 3 is a front elevational view of the present invention in a closed configuration.

Finally, L-shaped light assembly 24 includes a pair of red stop signals 36, a pair of amber caution signals 38, and a pair of green go signals 40. Signals 36, 38 and 40 preferably comprise double lens signals to eliminate the necessity of using twelve individual lamps. Inasmuch as devive 10 is battery operated, this double lens system also serves the useful purpose of conserving electrical energy. It should also be noted that while the embodiment is illustrated as comprising an L-shaped light assembly, it is further contemplated that the assembly may be constructed to include four display surfaces much like a standard traffic signal. FIG. 2 illustrates device 10 with light assembly 24 in its retracted position and with front 12 cut away to expose the interior of device 10. As shown in FIG. 2, electrical energy is provided by a pair of 6 volt, 30 amp batteries 42. Batteries 42 are serially connected to control panel 44, which in turn is connected through an electrical conduit (not shown) extending through telescoping support 28 to light assembly 24. As best seen in FIG. 3, control panel 44 may be reached without removing front 12 through control panel access door 46.

Operatively installed for manipulation on the front of control panel 44 are the necessary on/off switch, the start switch, mode switch, and timing speed knob for regulating the function of device 10. The control circuit itself may be constructed of well-known components and operates in substantially the same manner as that of a standard traffic signal. However, for the sake of both portability and reliability, solid state circuitry is preferred. The on/off switch energizes the device. The mode switch enables the operator to select, for example, flashing amber or flashing red signals. The timing speed knob regulates the relative duration of red and green signals to automatically control the flow of traffic past the point where device 10 is installed. Finally, the start switch actuates the device in accord with the mode and timing speed already selected. After the controls are set to the desired mode and speed, door 46 is closed, and the entire device 10 is thereby sealed from the effects of adverse weather conditions.

As previously stated, because signals 36, 38 and 40 are of a double lens construction, only six lamp are necessary with assembly 24. This necessarily conserves energy and allows device 10 to operate approximately 8 to 9 hours on the power provided by batteries 42. While it would certainly be feasible to remove discharged batteries 42 and replace them with new or recharged batteries 42, it is further contemplated that device 10 may include battery charger means. As best seen in FIG. 3, a charger access door 48 may be provided in front 12. Located behind door 48 is a standard electrical conduit including a male plug, whereby device 10 may be plugged directly into a 110 volt AC receptacle. The conduit is electrically connected to a transformer, which is in turn electrically connected to batteries 42. It has been determined that batteries 42 may be fully charged in approximately eight to ten hours, when the battery is fully discharged by plugging device 10 into a 110 volt receptacle.

Figure 7:
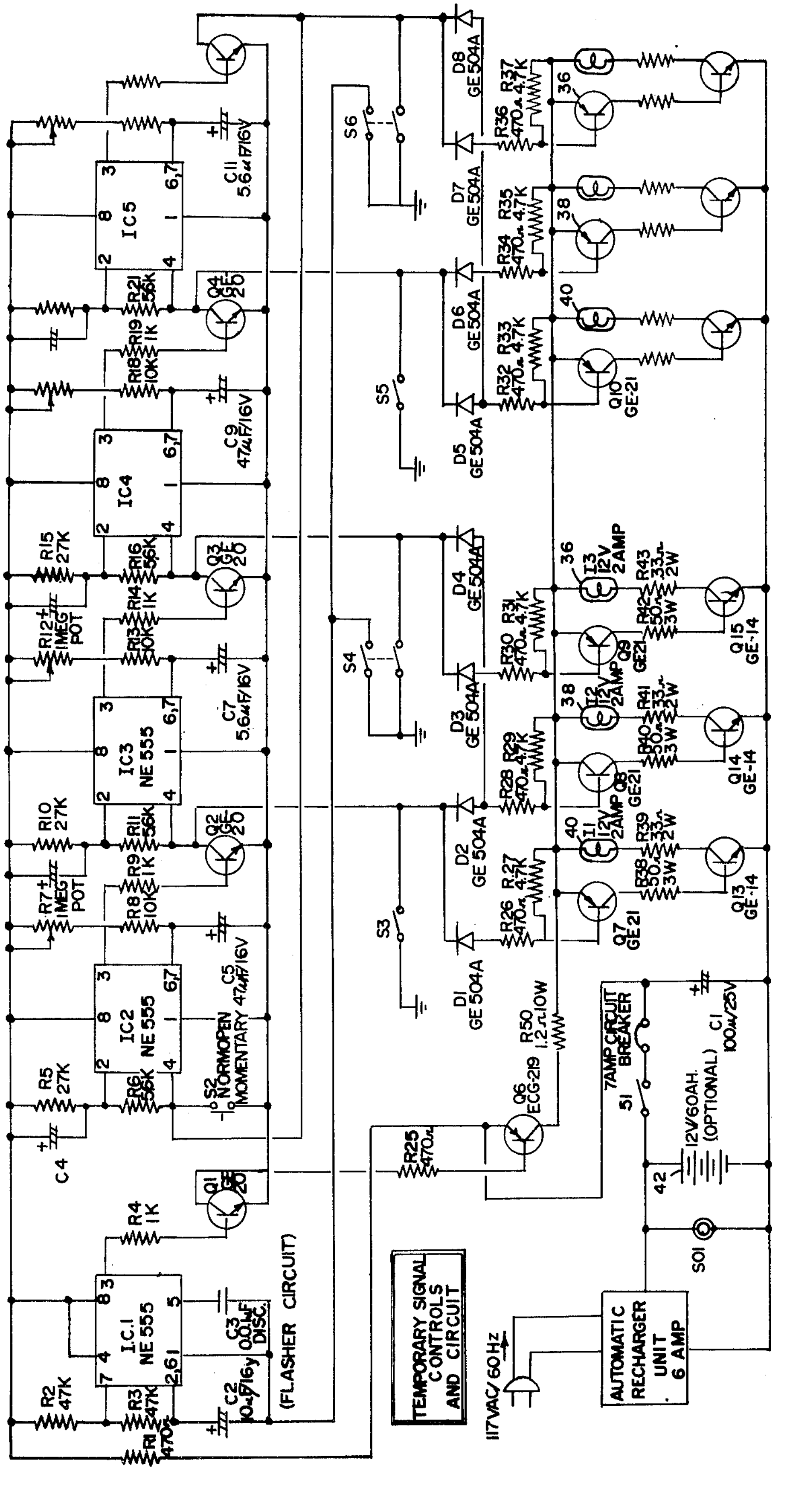

The electrical circuit is shown schematically in FIG. 7. Each lamp, 36, 38, 40 is controlled by lamp driver transistors, e.g., lamp 40 is controlled by lamp driver transistor Q7, Q13; lamp 38 by lamp driver transistors Q8, Q14, etc.

When the on/off switch S1 is closed, 12 volts DC is applied to the circuit via transistor Q6 and resistors R1 and R50. With switch S4 and S6 open, integrated circuit ICI is lifted above ground, leaving the output pin 3 positive, feeding into the base of transistor Q1 acting as an inverter amplifier, the collector goes negative into the base of transistor Q6 acting as an inverter/switch, driving the collector positive, turning on power to the lamps through resistor R50.

Momentarily closing switch S2 will pull pin 4 to ground and pin 2 to ground, pin 4 resetting IC2 and pin 2 triggering the integrated circuit to start timing. Upon releasing switch S2 the circuit will start the timing cycle, driving pin 3 positive into the base of transistor Q2 acting as an inverter/amplifier, driving its collector negative down through diodes D1 and D2 into the lamp driver transistors Q7, Q13, etc., turning on lamps I1 and I2. Transistor Q2's collector goes negative and pulls pin 4 of integrated circuir IC3 to ground and pin 2 to ground, resetting and triggering integrated circuit IC3. As long as transistor Q2's collector and pin 4 remain at ground potential, integrated circuit IC3 is off and not timing. As soon as the timing cycle of integrated circuit IC2 has ended, pin 3 goes positive. Transistor Q4's collector is negative through diodes D3 and D4. Lamp I1 goes off and lamp I3 comes on. Lamp I2 remains on via diode D4's anode being connected to diode D2's anode.

The on/off timing cycles carry on until switched off. The timing cycles are determined by resistors R7, R8, capacitors C5 for integrated circuit IC2, resistors R12, R13 and capacitor C7 for integrated circuit IC3; resistors R17, R18 and capacitor C9 for integrated circuit IC4, etc. The circuits are made variable by the resistor R7 from 0 to approximately 60 seconds for integrated IC2 and IC4, and from 0 to approximately 5 seconds for integrated circuits IC3 and IC5. Switches S3, S4, S5 and S6 lock the timers in a particular mode by holding the transistor's collectors (transistors Q2, Q3, Q4, Q5) to ground. Switches S4 and S6 not only lock the timers in that mode but also ground integrated circuit IC1 turning it on, set to oscillate instead of holding "time". Pin 3 remains on for half of its timing cycle; for the other half it goes off driving the collector of transistor Q1 positive turning transistor Q6 off and thus the lamps. This goes on at an oscillation of approximately 1 Hz rate until switches S4 and S6 are opened. This provides red and amber flashing if desired.

This circuitry is solid state and compact. The entire control panel and circuit is 6 inches × 4 inches × 3 inches or approximately the size of a standard cigar box. It can be mounted anywhere. The circuit is protected by a circuit breaker. The choice of batteries is optional, however a 12 V DC 60 AH, service-free battery is recommended. The device when operating on full cycle draws approximately 5½ amperes. Consequently, this type of battery will operate continuously for approximately 12 hours. The unit has its own charger (6 AMP) which, when 117 V AC 60 MHz is plugged into the charger, the traffic light will operate indefinitely for pennies per day. All components of the electrical circuitry unit are standard and can be obtained at appropriate retail outlets. It is designed for years of service and requires little maintenance.

Figure 4:
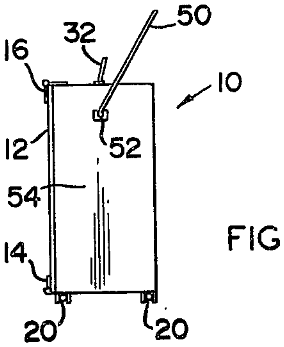
FIG. 4 is an end view of the device shown in FIG. 3.

Inasmuch as the device of the present invention is primarily intended for portable use, a handle 50 is provided for carrying purposes. As best seen in the side view of FIG. 4, handle 50 is hangedly attached at points 52 on corresponding sides 54 of device 10. Also because of the intended portability of device 10, a storage tray 56 is provided with the device. It is anticipated that tray 56 will be utilized for storing extra lamps, snap-on lenses with arrows for special traffic control, a battery brush and lubricant for battery terminals, and a screwdriver for removing lenses to replace burned out lamps.

It is to be noted that while the invention has thus far been described as including folding legs 18, it is contemplated that other support structures may be utilized. For examle, telescoping, tripod-like legs may be used. Additionally, it may even be desirable to suspend device 10 and assembly handle 32 may be utilized as the suspension point. Thus, by virture of the construction of the present invention, a truly portable traffic signal is provided. In operation, the entire device is fully enclosed, protecting all electrical and electronic components from water damage. The device can be operated without the need of an external electrical supply, and the batteries can be conveniently and economically recharged for subsequent use.

It is to be observed therefore that the present invention is primarily designed to provide a safe school zone crossing for children, by control of traffic. It is portable and can be set up in a matter of seconds and can be installed at any place, at any time. The light can be adjusted at various cycle speeds applicable to any situation, by simply turning the knobs, and when the main flow of child pedestrian traffic is concluded, a flashing amber light can be used to caution vehicular traffic of the school crossing. This is to protect "staggler" students. This flasher signal is optional, or the signal can operate normally as a standard signal the entire day, if so desired. Both modes are operated by a simple switch.

The signal will operate continuously for 12 hours and then the battery is recharged within 9 or 10 hours, by simply plugging a cord from a 115 V AC outlet into the receptacle. By having two batteries, one battery may be charging while the other is in use. Thus, loss of operation during charging time is prevented. The unit is also designed to operate indefinitely, by providing a 115 V AC line into the receptacle, which will keep the battery fully charged while in operation. This could provide months of continuous operation. Without change of batteries, a permanent crossing near the school could install a single 115 V AC line from the school building to furnish this capability, if so desired, or can be operated from any vehicle with 12 V DC, if desired.

The traffic signal can be removed and stored during the night and the entire operation is so simple that students could accomplish its installation, removal, and adjustments.

The signal will definitely provide a safer crossing for children, but the unit can also be used by police, firemen, civil defense, industrial plants, construction sites, parks, sports events, and any other place where traffic is a problem. The unit is versatile, due to its ability do direct traffic by using its arrows on the lights and directional signs such as "NO LEFT TURN", "NO RIGHT TURN", "NO TURNS", "RIGHT TURN ONLY", "LEFT TURN ONLY", etc., with lighted green arrows corresponding to each sign. These standard components, with spare bulbs and screwdriver are included with each unit.

The unit takes very little space when on its post and can be suspended in the manner of standard traffic signals if desired. The invention provides a definite safety device for motorists and pedestrians, but also eliminates the hazard of a policemen, civilian or school children being injured or killed while directing traffic. It also releases the policemen and his vehicle for more important duties in crime prevention.

The equipment is fully automatic, reliable, simple, low priced, requires very little maintenance, operates on pennies a day, and will operate in all kinds of weather conditions.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrated and not in a limiting sense.

It is also to be understood that the following claims are intended to cover all of the generic and specific features of the invention herein described, and all statements of the scope of the invention, which as a matter of language, might be said to fall therebetween.

Now that the invention has been described, What is claimed is:

1. A portable traffic signal comprising:

a. a cabinet having a box-like configuration with a top portion (34), an oblong vertical lamp means assembly (24) in said cabinet, said lamp means assembly (24) including a base (25) and a telescoping support (28), a cover (30) and a handle (32) so that the assembly (24) may be extended and retracted, said cover when retracted assuming a position substantially co-planer with said top portion (34);

b. a pair of red, amber and green signal lamp means (36, 38, 40) with double lens before each lamp means disposed in said lamp assembly, one pair over the other and so disposed that each lamp means of one pair directs light signals in a direction which is substantially at right angles to the other signals emitted by the other lamp means, one lamp means of each pair of the red, amber and green lamp means constituting a first set, the other lamp means of each pair of red, amber and green lamp means constituting a second set;

c. a lamp circuit including first and second wires, the three lamp means (36, 38, 40) of the first set being in parallel between said wires in sequence, the three lamp means of the second set being likewise in parallel between said wire in the same sequence, said first and second sets therefore forming six parallel circuits, a bias resistor in each parallel circuit and lamp driving transistor means (Q13, Q14, Q15) with diodes (D1 through D8) in each parallel circuit said bias resistors and lamp driving transistor means being in series with said lamp means;

d. a timing circuit coupled to each lamp means including third and fourth wires, first, second, third, fourth and fifth integrated circuits, (IC2, -3, -4, -5) between said third and fourth wires, each integrated circuit being a six-pin timing module including an output pin, a timing RC circuit in parallel with and coupled to each of said integrated circuits, said first integrated circuit being a flasher circuit, first, second, third, fourth and fifth gate transistor means, one being coupled to each integrated circuit output pin and a plurality of said lamp driver transistors via first through eight diodes (D1 through D8); and, e. DC lead lines for connecting powe across said first, second, third and fourth wires, a first on-off switch in said lead lines, a switching transistor (Q6) and a first power circuit resistor (R1) to said third and fourth wires and a second power circuit resistor (R50) to said first and second wires, a second switch in said timing circuit which is normally opened but will start the timing cycle when momentarily closed, third through sixth switches (S3 through S6) one being connected to each of said second, third, fourth and fifth transistor gate means (Q2 through Q5), whereby, f. when the on/off switch is closed, DC power is applied to the circuit via the switching transistor and the power circuit resistors (Q1, R1 and R50) with the fourth and sixth switches open, the first integrated circuit (IC1) is lifted above ground leaving the output pin thereof positive into the gate of its gate transistor (Q1), acting as an inverter/amplifier, the collector goes negative into the base of the switching transistor (Q6) acting as an inverter/-switch driving the collector positive, turning on the power to the lamp drivers and lamp means through the power circuit resistor (R50), momentarily closing second switch (S2) will pull pin four to ground and pin two toward ground, pin four resetting the second integrated circuit (IC2) and pin two triggering this integrated circuit to start timing, upon releasing the second switch (S2), the circuit will start the timing cycle, driving pin three positive into the base of its gate transistors (Q2) acting as an inverter amplifier, driving its collector negative through diodes (D1 and D2) into the lamp driver transistors turning on the first and second lamp means (I1, I2), the second gate collector going negative and pulls that third integrated circuit (IC3) pin four to ground and pin two towards ground, resetting and triggering the third integrated circuit (IC3), as long as the second gate transistor (Q2) collector and pin 4 remain at ground potential, third integrated circuit (IC3) is off and not timing, but, as soon as the timing cycle of the second integrated circuit is ended, pin 3 goes negative and second gate transistor (Q2) goes positive, the third integrated circuit (IC3) starts timing, pin 3 goes positive, the next transistor (Q4) collector goes negative through diodes (D3, D4), first lamp means (I1) goes off and third lamp means (I3) comes on but second lamp means (I2) remains on via a fourth diode (D4) being connected to the anode of second diode (D2), said on/off timing cycles carrying on until switched off.

* * * * *